United States Patent [19] Hemphill

[11] 3,740,538

[45] June 19, 1973

[54] DIGITAL SORTER AND RANKER

[75] Inventor: Julie A. Hemphill, Los Altos, Calif.

[73] Assignee: The United States of America as represented by the Secretary of the Air Force

[22] Filed: July 28, 1971

[21] Appl. No.: 166,898

[52] U.S. Cl. ............ 235/177, 340/146.2, 340/172.5

[51] Int. Cl. ............ G06f 7/06, G06f 7/00

[58] Field of Search ............ 235/177; 340/172.5, 340/146.2

[56] References Cited

UNITED STATES PATENTS

| | | | |
|---|---|---|---|
| 3,428,946 | 2/1969 | Batcher | 340/146.2 |
| 3,418,632 | 12/1968 | Batcher | 340/146.2 |
| 3,034,102 | 5/1962 | Armstrong et al. | 235/177 X |
| 3,104,376 | 9/1963 | Nadler | 340/146.2 X |
| 3,015,089 | 12/1961 | Armstrong | 340/172.5 |

*Primary Examiner*—Malcolm A. Morrison
*Assistant Examiner*—James F. Gottman
*Attorney*—Harry A. Herbert, Jr. and Julian L. Siegel

[57] ABSTRACT

A digital sorter and ranker in which pairs of binary words are subtracted from each other in adders by feed-in in one word of the pair together with the adjacent word one's complement. A carry output indicates which word is the lowest and this output is fed through coincidence logic circuits to additional series of address and logic circuits in pyramid fashion until a single output is obtained from a final adder. The adder logic circuits, the carry output and the output of the final adder are fed through minimum value logic circuits to a series of minimum value flip-flops with the outputs thereof being fed back to the adders and their logic circuits. To record the rank of each word, a series of flip-flop groups with each group corresponding to a binary word is set according to the word's rank, the flip-flops being controlled by gating circuits fed by preceding logic circuits, the final adder, and a binary counter.

2 Claims, 10 Drawing Figures

INVENTOR
JULIE A. HEMPHILL
BY Harry A. Herbert Jr. and
Julian L. Siegel
ATTORNEYS Patented June 19, 1973 3,740,538

10 Sheets-Sheet 2

INVENTOR
JULIE A. HEMPHILL
BY Harry A. Herbert Jr
Julian L. Siegel and
ATTORNEYS

INVENTOR
JULIE A. HEMPHILL

BY Harry A. Herbert Jr
Julian L. Siegel and
ATTORNEYS

INVENTOR
JULIE A. HEMPHILL
BY Harry A. Herbert Jr.
Julian L. Siegel
ATTORNEYS

INVENTOR
JULIE A. HEMPHILL
BY Harry A. Herbert Jr. and Julian L. Siegel
ATTORNEYS Patented June 19, 1973 3,740,538

10 Sheets-Sheet 6

INVENTOR
JULIE A. HEMPHILL
BY Harry A. Herbert Jr.
Julian L. Siegel and
ATTORNEYS INVENTOR
JULIE A. HEMPHILL
BY Harry A. Herbert Jr and
Julian L. Siegel
ATTORNEYS INVENTOR
JULIE A. HEMPHILL
BY Harry A. Herbert Jr. and Julian L. Siegel
ATTORNEYS INVENTOR
JULIE A. HEMPHILL
BY Harry A. Herbert Jr
Julian L. Siegel and
ATTORNEYS INVENTOR
JULIE A. HEMPHILL
BY Harry A. Herbert Jr.
Julian L. Siegel
ATTORNEYS

DIGITAL SORTER AND RANKER

BACKGROUND OF THE INVENTION

This invention relates to computer logic systems, and more particularly to ranking and sorting a set of binary codes. The usual method of performing a sorting or ranking operation on digital numbers is to use a general purpose digital computer. Unfortunately, the construction of general purpose computers is such that sorting or ranking these operations requires a computation time that is excessive or is not economical for some applications, particularly applications involving real time decisions and/or on-line control.

Various algorithms may be used to sort a set of numbers or to determine a rank with a general purpose digital computer. Speed will vary depending upon the number of words, word size, and computer capabilities. This invention is most advantageously employed when the number of words is relatively small (less than or equal to 32).

The number of computer instructions required to find the $K^{th}$ rank out of N words is approximately: (three instructions) × (N words)×(K). The number of instructions required for a complete sort of N words is approximately: (three instructions)×(N words)×(N). Assuming an average of two computer cycles per operation and a computer cycle time of one microsecond, to find the fifth rank of 16 words requires about 240 microseconds. For a complete sort of 16 words, about 1-½ milliseconds is required.

SUMMARY OF THE INVENTION

The purpose of this invention is to provide a rapid means for ranking a set of N unordered binary numbers. Part of the logic may be eliminated to provide a rapid means for finding the $K^{th}$ ranking member of a set of numbers.

For purposes of the description, it is assumed that there are 16 words of 8 bits per word. The design uses 15 adders to rank the 16 words. For a complete sort of the 16 numbers, operating time is about 8 microseconds. Finding the fifth rank of a set of 16 numbers requires about 3 microseconds.

This device can be used as a peripheral element of a general purpose computer analysis, decision, or control configuration. It has particular application in real time processing when speed is critical.

It is therefore an object of this invention to provide a novel and improved system for sorting a series of binary words and determining the rank of each word.

It is another object to provide a digital ranking and sorting system having a greater speed than that used in the past.

It is still another object to provide a digital ranking and sorting system that provides real time processing and can be used in computer analysis, decision and control configurations.

These and other advantages, features and objects of the invention will become more apparent from the following description taken in connection with the illustrative embodiment in the accompanying drawings.

DETAILED DESCRIPTION OF THE PREFERRED EMBODIMENT

Figure 1:
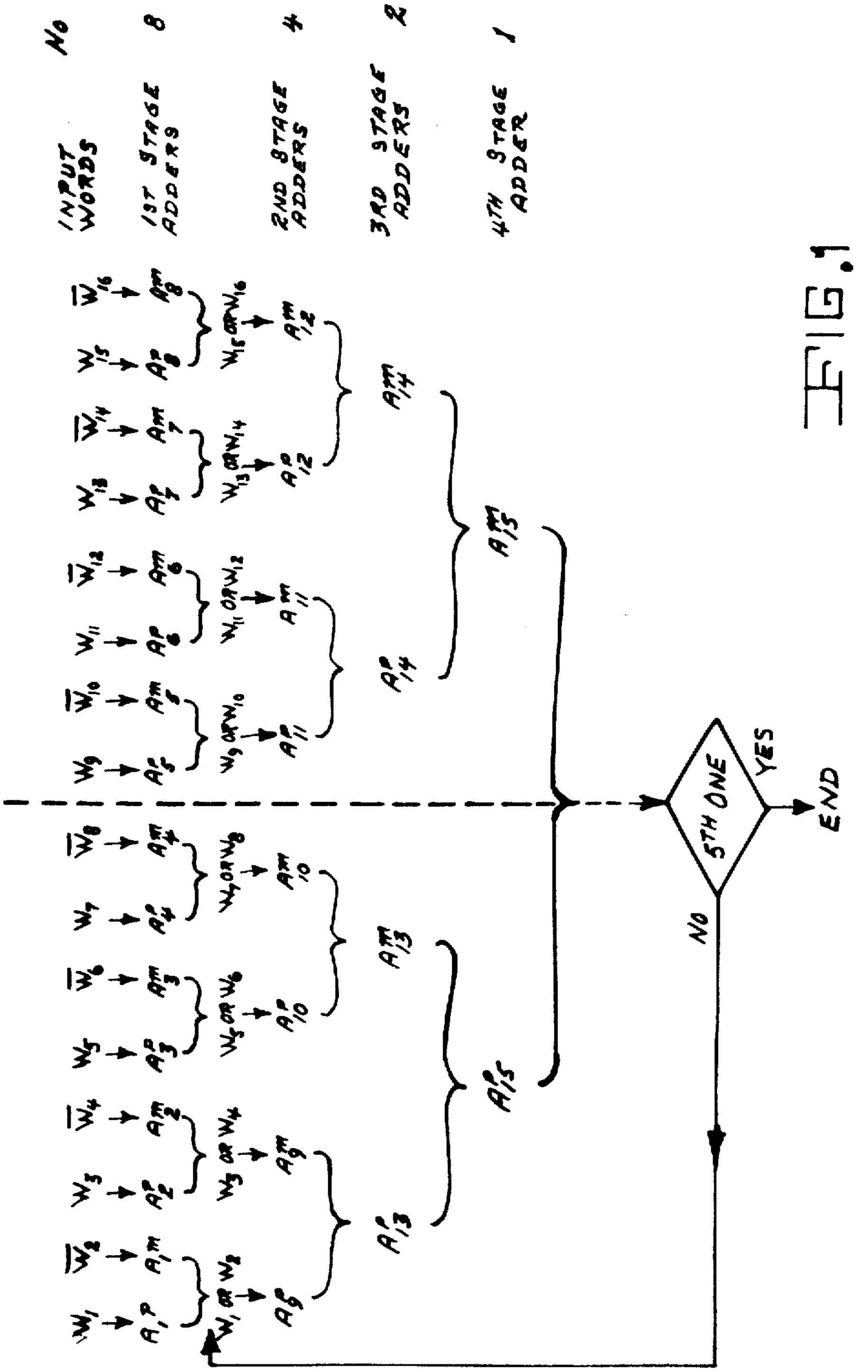
FIG. 1 shows the logic flow diagram used in the explanation of the invention.

In the example shown in FIG. 1, fifteen adders are used to make parallel comparisons. The adders are designated $A_1^p$, $A_1^m$, $A_2^p$, $A_2^m$, etcetera, where the *p* and *m* indicate the plus and minus inputs of the adders. The words are designated as $W_1$, $W_2$, etcetera, and their complements are $\overline{W}_1\overline{W}_2$, etcetera. Initially all 16 words are compared in pairs in the first 8 adders (word 1 with word 2, word 3 with word 4, etcetera). The lowest word of each pair is fed to one of the next four adders. The lowest words from these comparisons are fed to two adders. Finally, two words are compared in the 15th adder yielding the minimum value of the 16 words. The logic which will be explained later excludes this minimum from further comparisons.

It is not necessary to repeat the first set of comparisons. The next iterations begin with an eight word input and 16 minimum value flip-flops record the lowest words. A minimum value flip-flop is set when the corresponding word is found to be the next lowest value. These flip-flops are clocked at the end of each iteration and the new minimum value causes a new set of inputs to be gated to the adders. A sort key flip-flops corresponding to the current lowest word are set to the current value of the counter so that at the end of 16 iterations the sort key flip-flops contain the rank for each word. The counter is used to control the number of iterations. If the fifth rank is desired, as shown, at the end of five iterations the minimum value flip-flops are cleared of their previous values and only the fifth rank flip-flop is set. A modulo 5 counter is used for the control.

The minimum value flip-flops, the sort key flip-flops, and the counter are all reset to zero initially.

For making the comparisons in the adders, the one's complement of every other word is gated to the adders. If the carry bit is a one, the second word is less than the first.

Figure 2A:
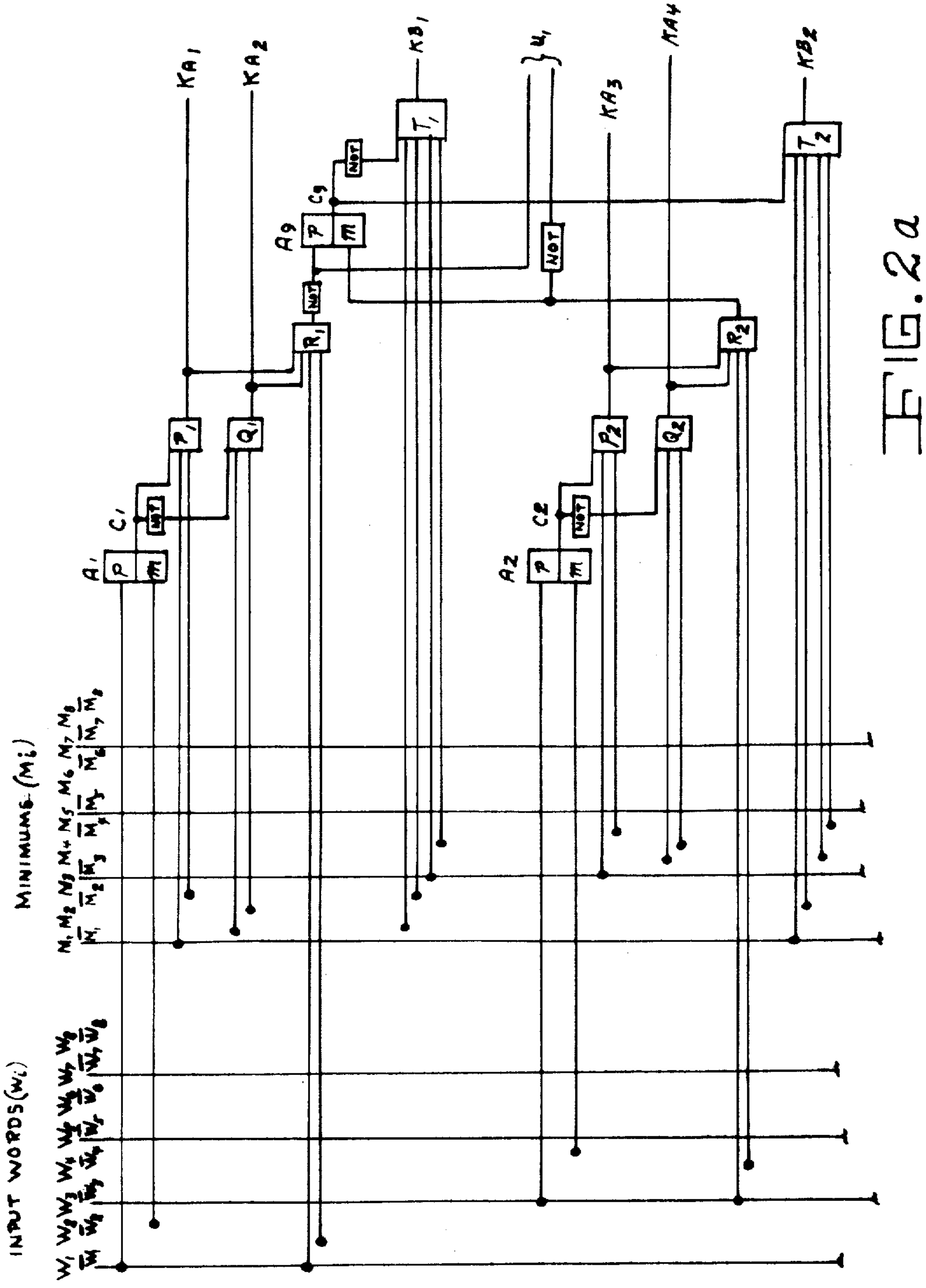
FIGS. 2*a* through 2*e* are block diagrams of an embodiment of the invention.
Figure 2B:
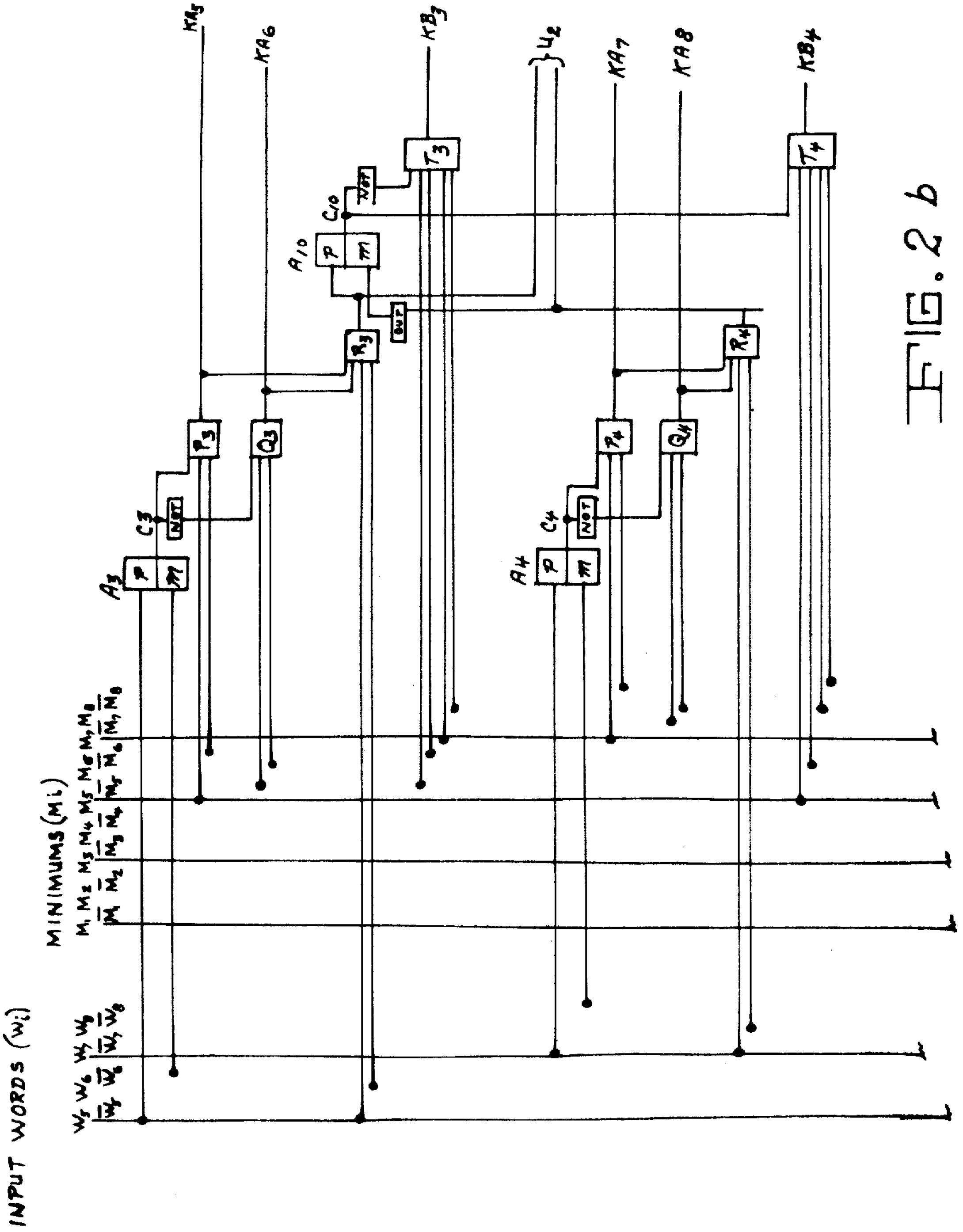
Figure 2C:
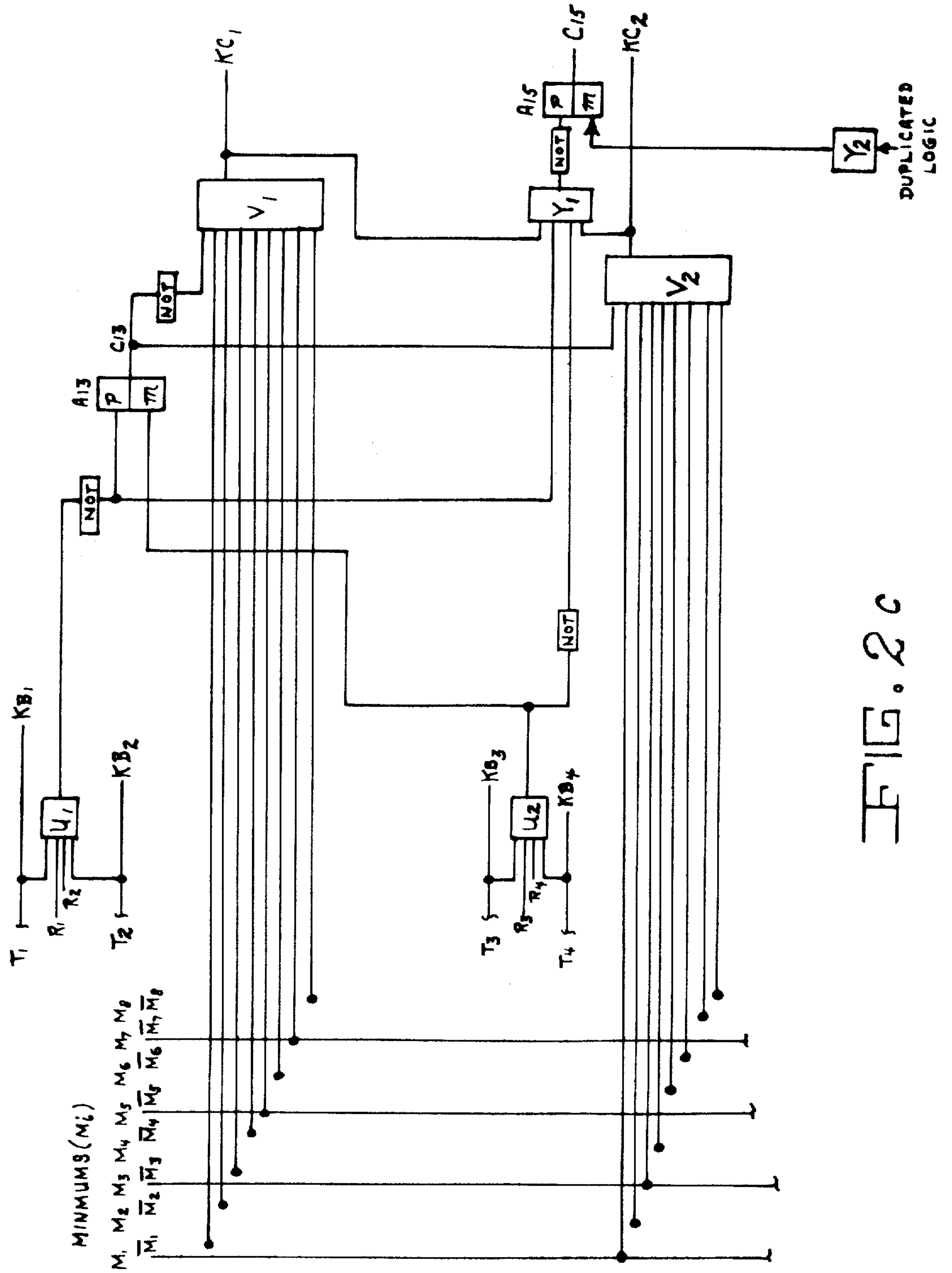

In FIG. 2*a*, 2*b* and 2*c*, the blocks $A_1$, $A_2$. . . represent the adders. The *p* and *m* sides of the adders correspond to the plus and minus sides of the adders and using the notation of FIG. 1, $A_1 = A_1^p$ and $A_1^m$, $A_2 = A_2^p$ and $A_2^m$, etcetera. The lines $W_1$, $W_2$, . . . on the left-hand side of FIGS. 2*a* and 2*b* represent the input words and correspond to the input words shown in FIG. 1.

Figure 2D:
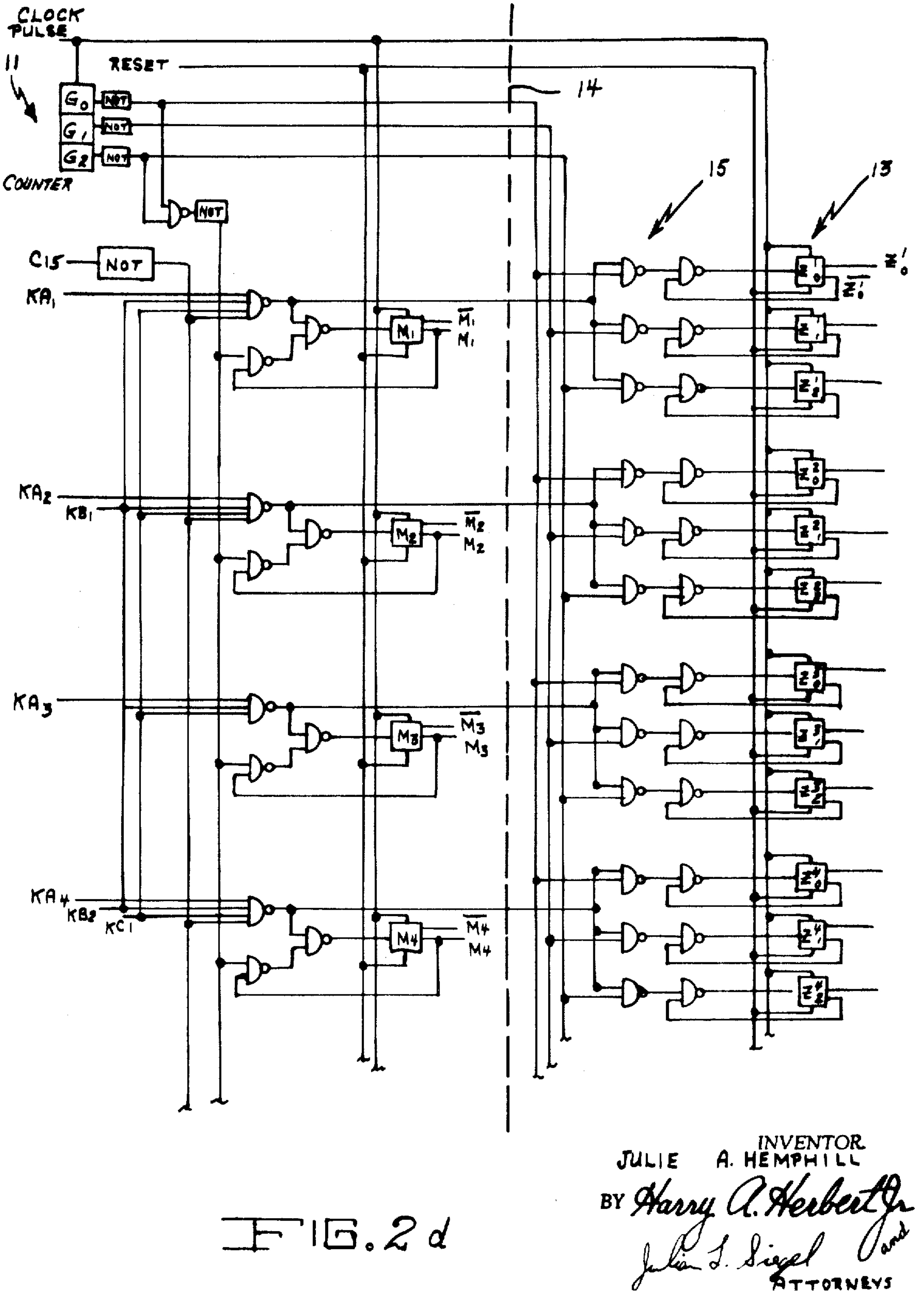

The notation used in the logic diagrams is as follows:

$W_i$ are the input words;

$G_0G_1G_2$ are stages of three bit counter 11 (modulo K to find the $K^{th}$ rank) appearing in FIG. 2*d;*

Figure 2E:
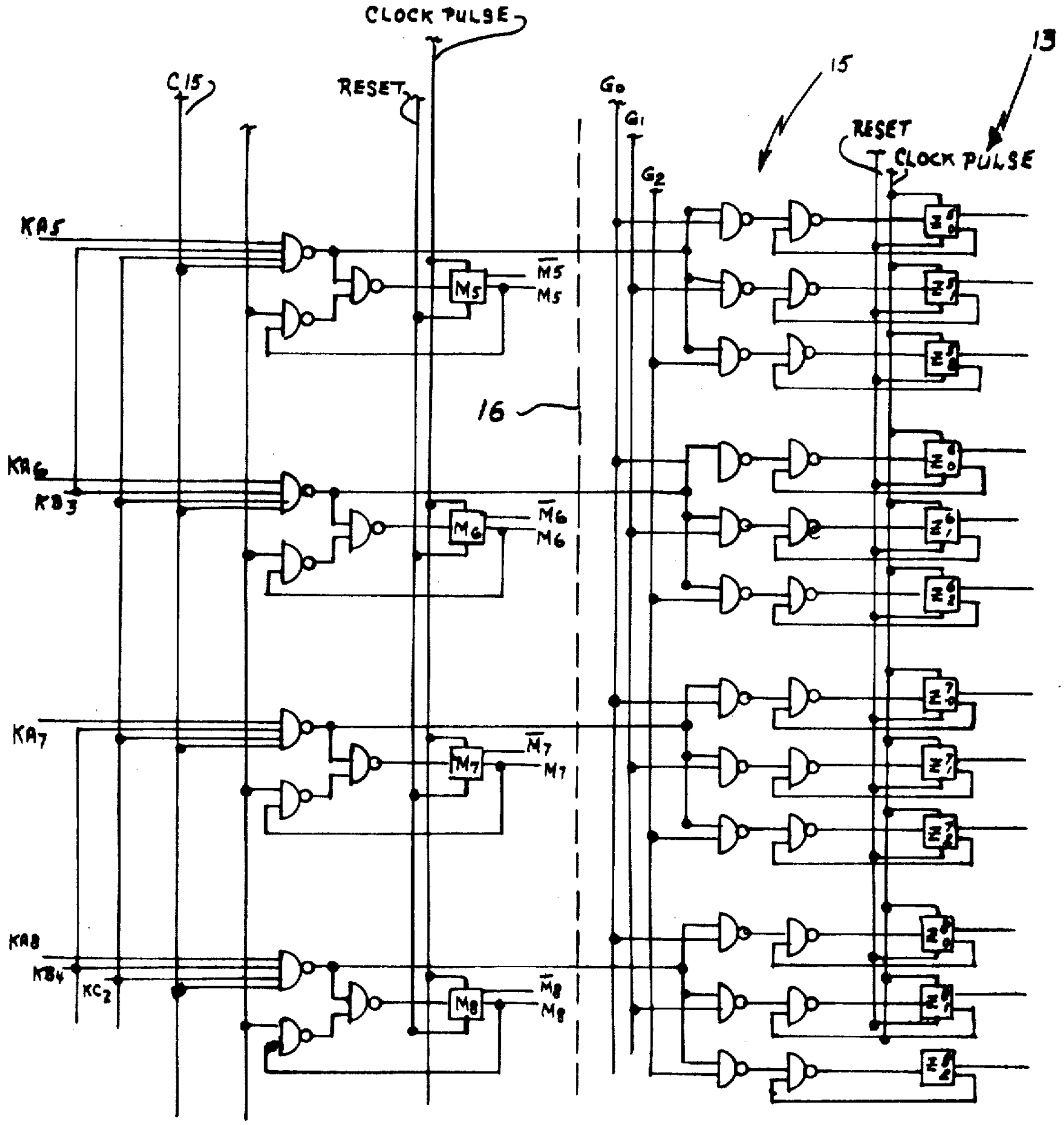

$M_i$ are the minimum value flip-flps (delay flip-flops), or the respective outputs thereof. At the end of one cycle of counter 11 the flip-flop which is set denotes the position of the $K^{th}$ ranking value. The output of these flip-flops are the inputs shown in FIGS. 2*a* to 2*c*;

$Z_0^iZ_1^iZ_2^i$ shown in FIGS. 2*d* and 2*e* are stages of the sort key flip-flops 13. At the end of one set of comparisons flip-flops 13 contain the rank (in binary form) of the *i*th word.

The logic is for a 16 word input, but only an eight word input is shown. The logic for words nine to 16 is identical to that shown in FIGS. 2*a* to 2*d* up to and including logic block $Y_1$. Logic block $Y_2$ from the duplicated logic is fed to adder $A_{15}$ shown in FIG. 2c. An exact duplicate of the logic is required for words nine to 16.

The logic as shown in FIGS. 2a through 2d handles only one bit from each of the input words. If there are 8 bits per word, there will be eight times as many logic elements. For example, for 16 input words of 8 bits each there will be a total of 16 Y blocks ($8Y_1$ plus $8Y_2$). Each adder will handle two 8 bit words. The number of logic blocks does not depend on the number of bits, i.e., there will be a total of 16 minimum value flip-flops regardless of the number of bits per word.

The last set of gates 15 and $Z_i$ delay flip-flops 13 appearing on the right side of dotted lines 14 and 16 shown in FIGS. 2e and 2d respectively are not necessary when the device is to be used to find one rank.

As shown in FIGS. 2a through 2c, it is seen that the first input word ($W_1$) is fed to the plus half of the first adder ($A_1$) and the ones complement of the second word ($\overline{W}_2$) goes to the minus half of the first adder. Then either $W_1$ or $W_2$ is gated into the plus half of the ninth adder ($A_9$). On the first comparison, the lower of the two values is gated to $A_9$. The choice will be determined by the value of the carry bit ($C_1$) from the first adder. On succeeding comparisons, the choice of $W_1$ or $W_2$ will depend also on whether $W_1$ or $W_2$ have already been identified as minimum values, i.e., the choice will depend on $M_1$ and $M_2$ as well as $C_1$. For example, if $W_1$ is found to be the lowest value of the 16 words, then $M_1$ will be set to one and $W_1$ will be ignored on succeeding iterations. The gating involving $M_1$, $M_2$ and $C_1$ is performed in logic blocks $P_1$, $Q_1$, an $R_1$.

A similar gating function is performed in logic blocks T and U. Logic blocks $T_1$, $T_2$, and $U_1$ control the input to the plus half of the thirteenth adder. The choice of $W_1$, $W_2$, $W_3$, or $W_4$ as input to $A_{13}^P$ depends on the value of the carry bit ($C_9$) from the ninth adder and on $M_1$, $M_2$, $M_3$, and $M_4$. Logic blocks $V_1$, $V_2$, and $Y_1$ control the input to the plus half of the fifteenth adder.

The logic used to set the minimum value flip-flops ($M_1, M_2, \ldots M_{16}$) is shown in the first half of FIGS. 2e and 2d. The setting of a flip-flop depends on the carry bit ($C_{15}$) from the last adder and on the previous values of these flip-flops. If the first word has the lowest value out of the 16 words, $M_1$ will be set to a one at the end of the first set of comparisons. Simultaneously the value of counter 11 (which equals zero for the first set of comparisons) is gated into the $Z^1$ flip-flops ($Z_0{}^1Z_1{}^1Z_2{}^1$). The counter is shown at the top of FIG. 2d and is increased by one at the end of each set of comparisons. Suppose that the fourth word is found to be the second from the lowest value. Then $M_4$ will be set to a one on the second iteration and the counter value (which will be equal to one) will be gated into the $Z^4$ flip-flops.

Figure 3:
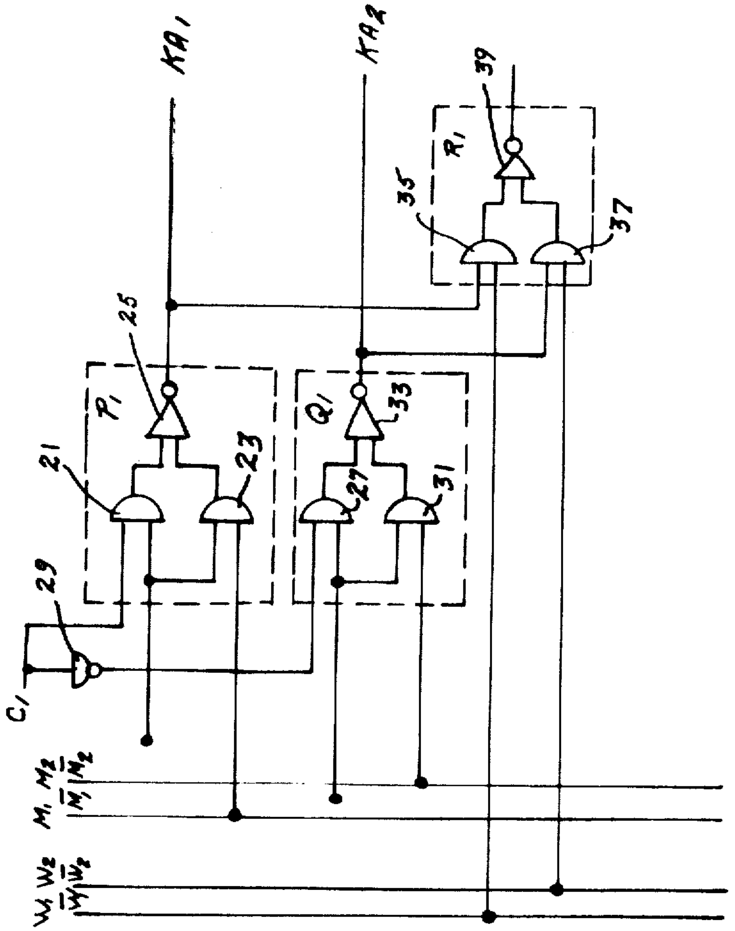
FIGS. 3, 4, and 5 are details of that shown in FIGS. 2*a* through 2*e* further describing the logic blocks.

Referring to FIG. 3 which shows the details of logic blocks $P_1$, $Q_1$, and $R_1$, that were shown in FIG. 2a, $P_1$ comprises AND gate 21 fed by $C_1$ and $\overline{M}_2$ and AND gate 23 fed by $M_1$ and $\overline{M}_2$. The output of gates 21 and 23 are then fed to OR gate 25. $Q_1$ comprises AND gate 27 fed by the negative of $C_1$ (due to Not Circuit 29) and $\overline{M}_1$ and AND gate 31 fed by $\overline{M}_1$ and $M_2$. The outputs of AND gates 27 and 31 are then fed to OR gate 33. $R_1$ comprises AND gate 35 fed by $P_1$ and $W_1$ and AND gate 37 fed by $Q_1$ and $W_2$. The output of the AND gates 35 and 37 are then fed to OR gate 39.

Figure 4:
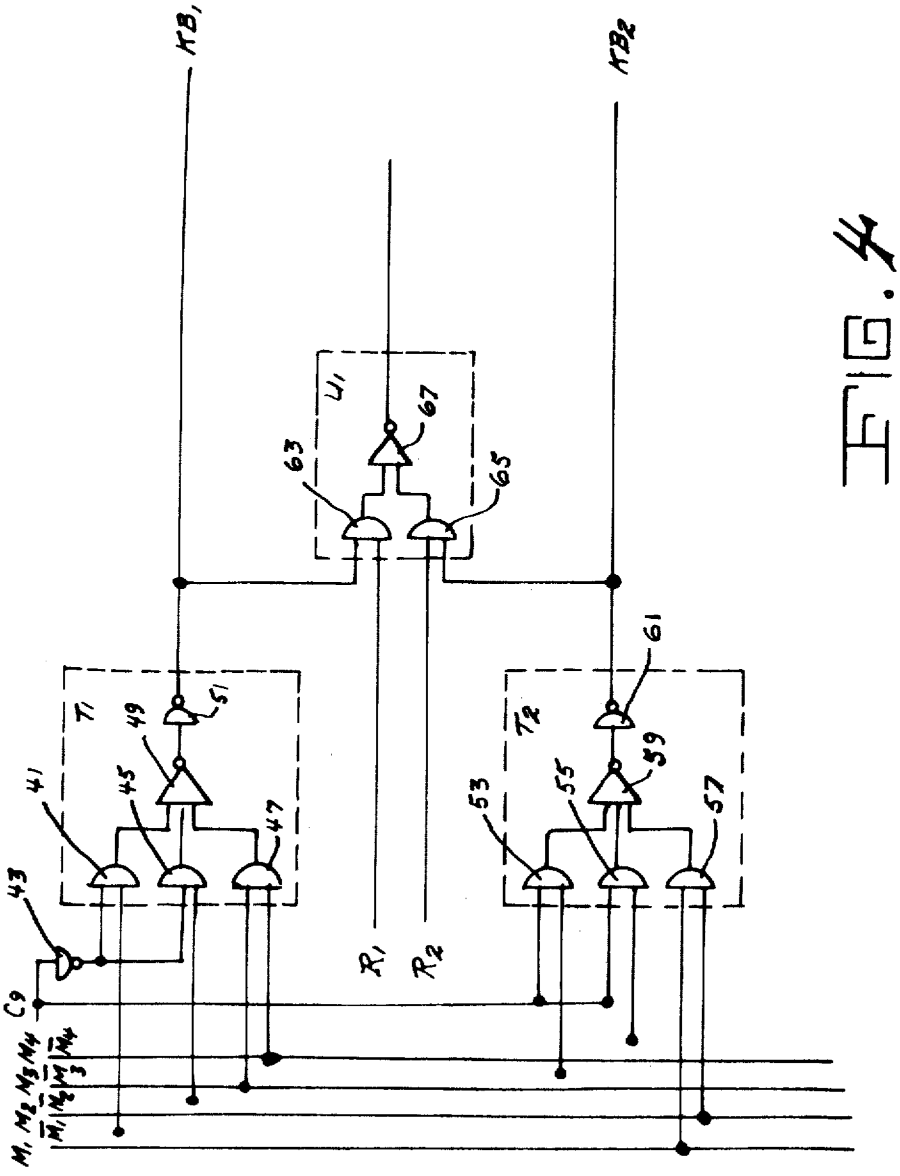

Referring to FIG. 4 which shows the details of logic blocks $T_1$, $T_2$, and $U_1$ that were shown in FIGS. 2a and 2c, $T_1$ comprises AND gate 41 fed by the negative of $C_9$ (due to Not circuit 43) and $\overline{M}_1$, AND gate 45 fed by the negative of $C_9$ and $\overline{M}_2$, and AND gate 47 fed by $M_3$ and $M_4$. The outputs of AND gates 41, 45 and 47 are fed to OR gate 49 and then to Not circuit 51. $T_2$ comprises AND gate 53 fed by $C_9$ and $\overline{M}_3$, AND gate 55 fed by $C_9$ and $\overline{M}_4$, and AND gate 57 fed by $M_1$ and $M_2$. The outputs of AND gates 51, 53, and 55 are fed to OR gate 59 and then to Not circuit 61. $U_1$ comprises AND gate 63 fed by $T_1$ and $R_1$ and AND gate 65 fed by $R_2$ and $T_2$. The outputs of AND gates 63 and 65 are then fed to OR gate 67.

Figure 5:
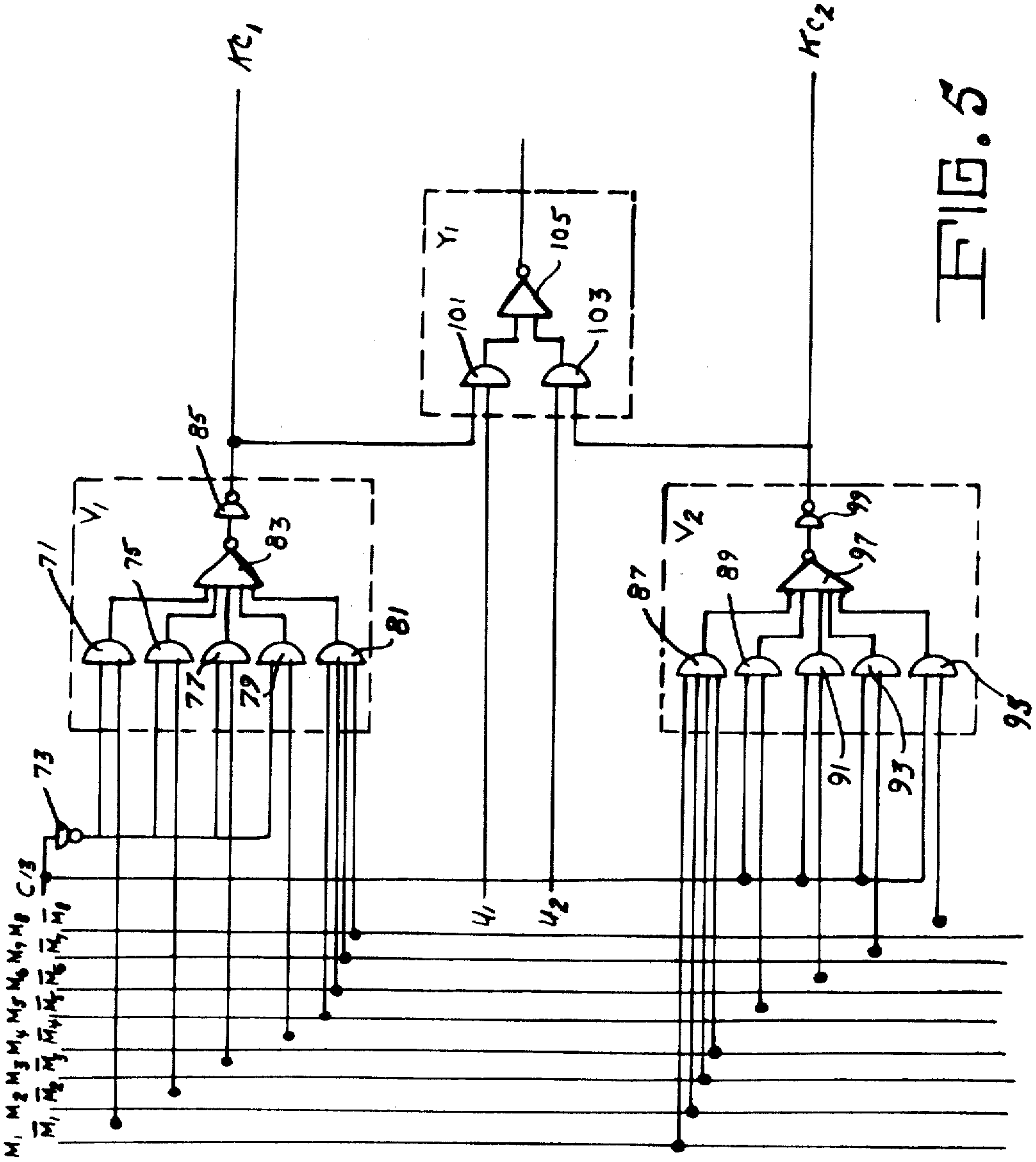

Referring to FIG. 5 which shows the details of logic blocks $V_1$, $V_2$, and $Y_1$ that were shown in FIG. 2c, $V_1$ comprises AND gate 71 fed by the negative of $C_{13}$ (due to Not circuit 73) and $\overline{M}_1$, and gate 75 fed by the negative of $C_{13}$ and $\overline{M}_2$, and gate 77 fed by the negative of $C_{13}$ and $M_3$, and AND gate 79 fed by the negative of $C_{13}$ and $M_4$, and AND gate 71 fed by $M_5$, $M_6$, $M_7$, and $M_8$. The outputs of AND gates 71, 75, 77, 79, and 81 are fed to OR gate 83 and then to Not circuit 85. $V_2$ comprises AND gate 87 fed by $M_1$, $M_2$, $M_3$, and $M_4$, AND gate 89 fed by $\overline{M}_5$ and $C_{13}$, AND gate 91 fed by $\overline{M}_6$ and $C_{13}$, AND GATE 93 fed by $\overline{M}_7$ and $C_{13}$, and AND gate 95 fed by $\overline{M}_8$ and $C_{13}$. The outputs of AND gates 87, 89, 91, 93 and 95 are fed to OR gate 97 and then to Not Circuit 99. $Y_1$ comprises AND gate 101 fed by $V_1$ and $U_1$ and AND gate 103 fed by $U_2$ and $V_2$. The output of AND gates 101 and 103 are then fed to OR gate 105.

Figure 6:
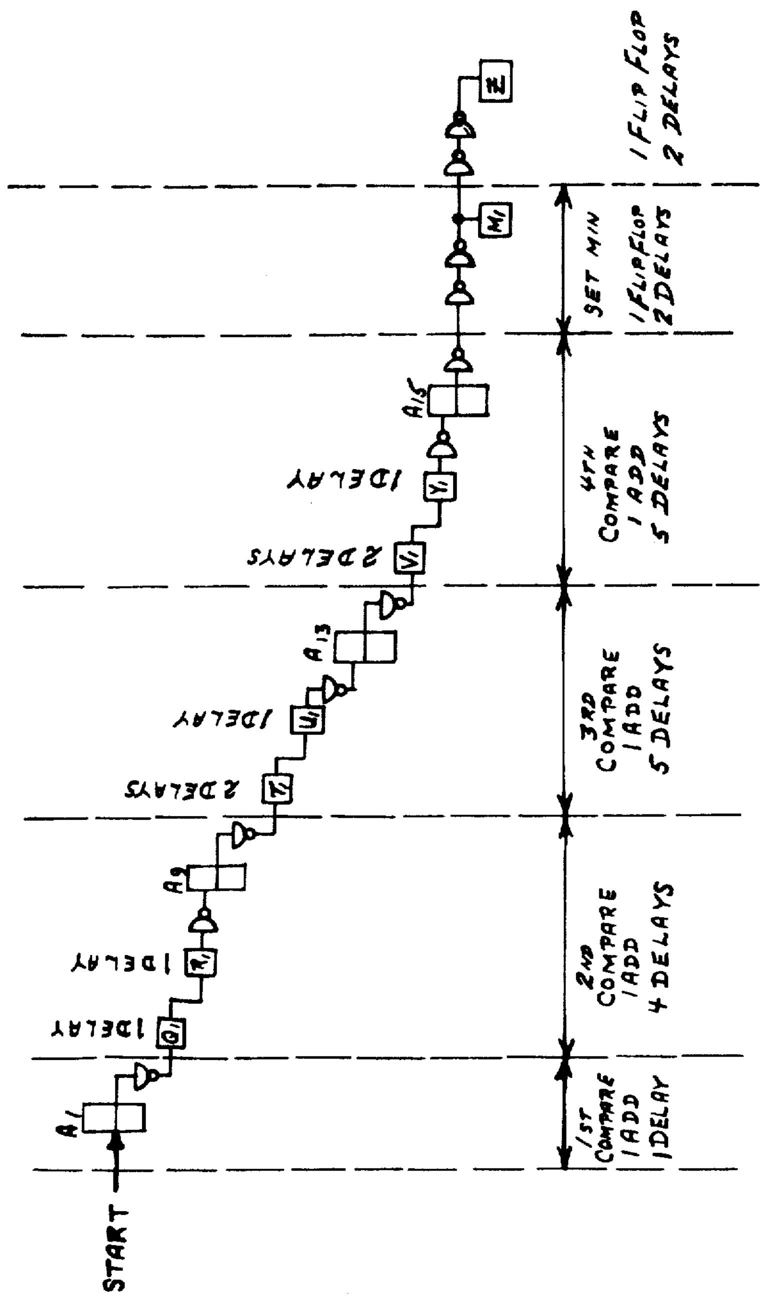
FIG. 6 is a timing diagram showing the maximum pattern length.

The timing relationship of the sorter and ranker is shown in FIG. 6 where a typcial route is used as an example. This route starts at adder $A_1$ and terminates at Z flip-flop. The horizontal distance represents the comparative measure of time.

It is claimed:

1. A system for sorting and ranking a series of binary words comprising:

a. a first series of comparing adders, each adder fed by a sequential pair of words from the series of binary words with one of each pair being a one's complement and having an output representing the lowest value thereof;

b. a first series of pairs of coincidence logic circuits, each pair corresponding to one each of the first series of comparing adders fed by the output of the comparing adder;

c. a second series of coincidence logic circuits fed by one pair each of the first series of pairs of conicidence logic circuits and by the corresponding pais of binary words;

d. a second series of comparing adders, each adder fed by pairs of the second series of coincidence logic circuits;

e. a third series of pairs of coincidence logic circuits each pair enabled by one of the second series of comparing adders;

f. a fourth series of coincidence logic circuits fed by one each of the third series of coincidence logic circuits and sequential pairs of the second series of coincidence logic circuits;

g. a final comparing adder fed by the fourth series of coincidence logic circuits;

h. a series of minimum value gating circuits fed by the final comparing adder, the first series of pairs of coincidence logic circuits, and the third series of pairs of coincidence logic circuits;

i. a counter feeding the series of minimum value gating circuits; and j. a series of minimum value flip-flops each corresponding to one binary word and fed by one each of the series of minimum value gating circuits, the output of the minimum value flip-flops being fed to the first and third series of coincidence logic circuits.

2. A system for sorting and ranking a series of binary words according to claim 1 which further comprises:

a. a plurality of series of ranking flip-flops, each series corresponding to a binary word;

b. a plurality of ranking gating circuits interposed between the ranking flip-flop and the minimum value gating coincidence logic circuits, and c. a binary counter feeding enabling pulses to the plurality of ranking gating circuits.

* * * * *